US010423786B2

(12) United States Patent
Beveridge et al.

(10) Patent No.: US 10,423,786 B2
(45) Date of Patent: *Sep. 24, 2019

(54) SYSTEM AND METHOD FOR STATISTICAL ANALYSIS OF COMPARATIVE ENTROPY

(71) Applicant: McAfee, LLC, Santa Clara, CA (US)

(72) Inventors: David Neill Beveridge, Hillsboro, OR (US); Abhishek Ajay Karnik, Portland, OR (US); Kevin A. Beets, Ladera Ranch, CA (US); Tad M. Heppner, Göteborg (SE); Karthik Raman, San Francisco, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,158

(22) Filed: Nov. 15, 2016

(65) Prior Publication Data
US 2017/0061125 A1    Mar. 2, 2017

Related U.S. Application Data

(63) Continuation of application No. 13/232,718, filed on Sep. 14, 2011, now Pat. No. 9,501,640.

(51) Int. Cl.
G06F 21/55 (2013.01)
G06F 21/56 (2013.01)

(52) U.S. Cl.
CPC ......... *G06F 21/563* (2013.01); *G06F 21/56* (2013.01); *G06F 21/565* (2013.01)

(58) Field of Classification Search
None
See application file for complete search history.

(56) References Cited

U.S. PATENT DOCUMENTS

| 7,328,323 | B1 | 2/2008  | Conover           |
| 7,562,391 | B1 | 7/2009  | Nachenberg et al. |
| 7,877,808 | B2 | 1/2011  | van de Ven        |
| 7,941,853 | B2 | 5/2011  | Rozenberg         |
| 7,984,304 | B1 | 7/2011  | Waldspurger et al.|
| 8,069,484 | B2 | 11/2011 | McMillan          |

(Continued)

FOREIGN PATENT DOCUMENTS

KR    2011-0119918    11/2011    ........... G06F 21/22

OTHER PUBLICATIONS

International Search Report and Written Opinion; PCT/US2012/068398; pp. 9, dated Mar. 21, 2013.

(Continued)

*Primary Examiner* — Trang T Doan
(74) *Attorney, Agent, or Firm* — Byrne Poh LLP

(57) ABSTRACT

In accordance with one embodiment of the present disclosure, a method for determining the similarity between a first data set and a second data set is provided. The method includes performing an entropy analysis on the first and second data sets to produce a first entropy result, wherein the first data set comprises data representative of a first one or more computer files of known content and the second data set comprises data representative of a one or more computer files of unknown content; analyzing the first entropy result; and if the first entropy result is within a predetermined threshold, identifying the second data set as substantially related to the first data set.

30 Claims, 7 Drawing Sheets

(56) References Cited

U.S. PATENT DOCUMENTS

| | | | |
|---|---|---|---|
| 8,250,655 B1 | 8/2012 | Malanov | |
| 8,533,835 B2 | 9/2013 | Likhachev et al. | |
| 8,611,219 B2 | 12/2013 | Golie | |
| 8,671,449 B1* | 3/2014 | Nachenberg | H04L 63/145 |
| | | | 713/187 |
| 2007/0152854 A1* | 7/2007 | Copley | G06F 21/554 |
| | | | 341/51 |
| 2008/0025298 A1 | 1/2008 | Lev-Ran et al. | |
| 2008/0184367 A1* | 7/2008 | McMillan | G06F 21/563 |
| | | | 726/23 |
| 2008/0263669 A1* | 10/2008 | Alme | G06F 21/56 |
| | | | 726/24 |
| 2009/0055635 A1 | 2/2009 | Tani | |
| 2009/0300764 A1 | 12/2009 | Freeman | |
| 2010/0037317 A1* | 2/2010 | Oh | G06F 21/554 |
| | | | 726/23 |
| 2010/0115620 A1* | 5/2010 | Alme | G06F 21/563 |
| | | | 726/24 |
| 2010/0122088 A1 | 5/2010 | Oxford | |
| 2010/0281540 A1* | 11/2010 | Alme | G06F 21/563 |
| | | | 726/23 |
| 2012/0278884 A1* | 11/2012 | Menoher | G06F 21/564 |
| | | | 726/22 |
| 2013/0152200 A1 | 6/2013 | Alme et al. | |

OTHER PUBLICATIONS

Ormandy, "An Empirical Study to the Security Exposure to Hosts of hostile virtualized Environments", Citeseer, pp. 1-10, Jun. 29, 1905.

\* cited by examiner

SYSTEM AND METHOD FOR STATISTICAL ANALYSIS OF COMPARATIVE ENTROPY

RELATED APPLICATION

This application is a Continuation of U.S. patent application Ser. No. 13/232,718 filed Sep. 14, 2011, which is incorporated herein by reference in its entirety.

TECHNICAL FIELD

The present disclosure relates in general to computer systems, and more particularly performing a statistical analysis of comparative entropy for a computer file of known content and a computer file of unknown content.

BACKGROUND

As the ubiquity and importance of digitally stored data continues to rise, the importance of keeping that data secure rises accordingly. While companies and individuals seek to protect their data, other individuals, organizations, and corporations seek to exploit security holes in order to access that data and/or wreak havoc on the computer systems themselves. Generally the different types of software that seek to exploit security holes can be termed "malware," and may be categorized into groups including viruses, worms, adware, spyware, and others.

Many different products have attempted to protect computer systems and their associated data from attack by malware. One such approach is the use of anti-malware programs such as McAfee AntiVirus, McAfee Internet Security, and McAfee Total Protection. Some anti-malware programs rely on the use of malware signatures for detection. These signatures may be based on the identity of previously identified malware or on some hash of the malware file or other structural identifier.

This approach, however, relies on constant effort to identify malware computer files only after they have caused damage. Many approaches do not take a predictive or proactive approaches in attempting to identify whether a computer file of unknown content may be related to a computer file of known content or to a category of computer files.

Additionally, the difficulties in identifying whether a computer file of unknown content is related to a computer file of known content or belongs in a category of computer files is not limited to malware. Other types of information security may depend on identifying whether an accused theft is actually related to an original computer file, a daunting proposition for assets such as source code that may range for hundreds of thousands of lines.

SUMMARY

In accordance with the teachings of the present disclosure, the disadvantages and problems associated with statistical analysis of comparative entropy for computer files of unknown content may be improved, reduced, or eliminated.

In accordance with one embodiment of the present disclosure, a method for determining the similarity between a first data set and a second data set is provided. The method includes performing an entropy analysis on the first and second data sets to produce a first entropy result, wherein the first data set comprises data representative of a first one or more computer files of known content and the second data set comprises data representative of a one or more computer files of unknown content; analyzing the first entropy result; and if the first entropy result is within a predetermined threshold, identifying the second data set as substantially related to the first data set.

In accordance with another embodiment of the present disclosure, a system for determining the similarity between a first data set and a second data set is provided. The system includes an entropy analysis engine for performing an entropy analysis on the first and second data sets to produce a first entropy result, wherein the first data set comprises data representative of a first one or more computer files of known content and the second data set comprises data representative of a one or more computer files of unknown content, the entropy analysis engine configured to analyze the first entropy result; and a classification engine configured to, if the first entropy result is within a predetermined threshold, identify the second data set as substantially related to the first data set.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 8, wherein like numbers are used to indicate like and corresponding parts.

For the purposes of this disclosure, a "computer file" may include any set of data capable of being stored on computer-readable media and read by a processor. A computer file may include text files, executable files, source code, object code, image files, data hashes, databases, or any other data set capable of being stored on computer-readable media and read by a processor. Further a computer file may include any subset of the above. For example, a computer file may include the various functions, modules, and sections of an overall source code computer file.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
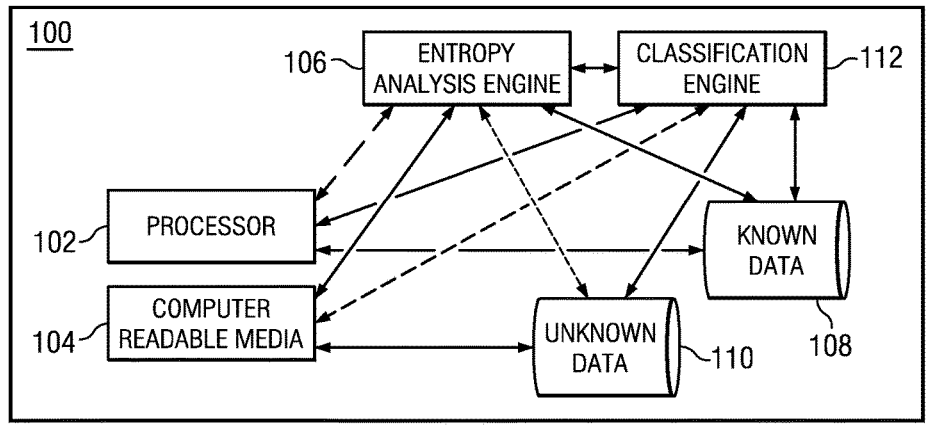
FIG. 1 illustrates a system for performing an entropy analysis on known and unknown data, in accordance with certain embodiments of the present disclosure.

FIG. 1 illustrates a system 100 for performing an entropy analysis on known and unknown data, in accordance with certain embodiments of the present disclosure. System 100 may include any suitable type of computing device(s) and in certain embodiments, system 100 may be a specialized and/or dedicated server for performing entropy analysis operations. In the same or alternative embodiments, system 100 may include a peripheral device, such as a printer, sound card, speakers, monitor, keyboard, pointing device, microphone, scanner, and/or "dummy" terminal, for example. System 100 may include one or more modules implemented as hardware components or stored on computer-readable media 104 and executable by processor 102, including entropy analysis engine 106 and classification engine 112.

Entropy analysis engine module 106 may be generally operable to perform an entropy analysis on a set of data representative of one or more computer files, as described in more detail below with reference to FIGS. 2-8.

In the same or alternative embodiments, system 100 may further include database 108 for storing known data and database 110 for storing unknown data. Databases 108,110 are shown as separate databases for ease of illustration. In some embodiments, known and unknown data may be stored in the same stand-alone database, the same or different portions of a larger database, and/or separate databases 108, 110. Further, databases 108, 110 or any appropriate implementation thereof may be a flat file database, hierarchical database, relational database or any other appropriate data structure stored in computer-readable media and accessible by entropy analysis engine 106 of system 100.

Databases 108, 110 may be communicatively coupled to entropy analysis engine 106 and classification engine 112 of system 100 via any appropriate communication path, including wired or wireless paths configured to communicate via an appropriate protocol, such as TCP/IP. For ease of description, the components of system 100 are depicted as residing on one machine. However, these components may be present in more or fewer machines than depicted in FIG. 1.

In operation, a user of system 100 may wish to analyze one or more computer files of unknown content. The user may wish to know whether the computer file(s) is derived in whole or in part from one or more computer files of known content. For instance, the user may wish to know whether a newly identified computer program (whether source code or executable) is related to or derived from a currently known computer program. Such may be the case in identifying new malicious software threats.

The user may also wish to know whether the computer file(s) of unknown content belong to a particular category of computer file. For instance, the user may wish to know whether the computer file(s) of unknown content is source code, a computer virus or other malicious software ("malware"), an image file, and/or all or a portion of a computer file of known content.

In some embodiments, entropy analysis engine 106 of system 100 may perform an entropy analysis on both the known data stored in database 108 and the unknown data stored in database 110. Entropy analysis engine 106 may then, in some embodiments, communicate the results of the entropy analysis to classification engine 112. Classification engine 112 may then perform a statistical analysis of the entropy analysis results to determine how closely related are the known and unknown data. If the relationship is within a certain threshold, system 100 may then communicate to the user that the known and unknown data are sufficiently related. In some embodiments, this may include communicating to the user that the unknown data is likely derived from the known data. In the same or alternative embodiments, this may include communicating to the user that the unknown data belongs to a particular category.

As an illustrative example, a user of system 100 may wish to learn whether a newly identified computer file belongs to a category of computer files known as malware (e.g., a virus or other malicious software). In some embodiments, database 108 of system 100 may contain data representative of the malware category. In some embodiments, this may include computer files representative of known viruses or other malicious software. In the same or alternative embodiments, this may include the source code of known malicious software, a hash of the source code, or other data representative of the content of the known malicious software. In the same or alternative embodiments, this may also include data derived from the content of the known malicious software, including a statistical analysis of the computer file (e.g., a probability distribution analysis), an entropy analysis of the computer file, or other data derived from the content of the known malicious software.

In the illustrative example, entropy analysis engine 106 may then perform an entropy analysis on the computer file of unknown content. In some embodiments, this entropy analysis may make use of some or all of the data representative of the malware category. For example, the entropy analysis may make use of a probability distribution function derived from the computer files representative of malware. In the same or alternative embodiments, the entropy analysis may be further normalized for further analysis. An example of this entropy analysis is described in more detail below with reference to FIGS. 2-5.

After performing the entropy analysis on the newly identified computer file, classification engine 112 may then compare the results of the entropy analysis to a threshold to determine whether the newly identified computer file belongs to the identified class (e.g., malware). For example, if a normalized entropy analysis based on data representative of an unknown data source and data representative of a known data source approaches one (1), then classification engine 112 may notify the user that the newly identified computer file likely belongs to the identified category. An example of this entropy analysis and comparison is described in more detail below with reference to FIGS. 5-8.

In some embodiments, classification engine 112 may include additional analysis steps to improve the determination of whether the newly identified file belongs to the identified category. In some embodiments, these steps, described in more detail below with reference to FIG. 2, may occur before, after, or simultaneously with, the entropy analysis.

Figure 2:
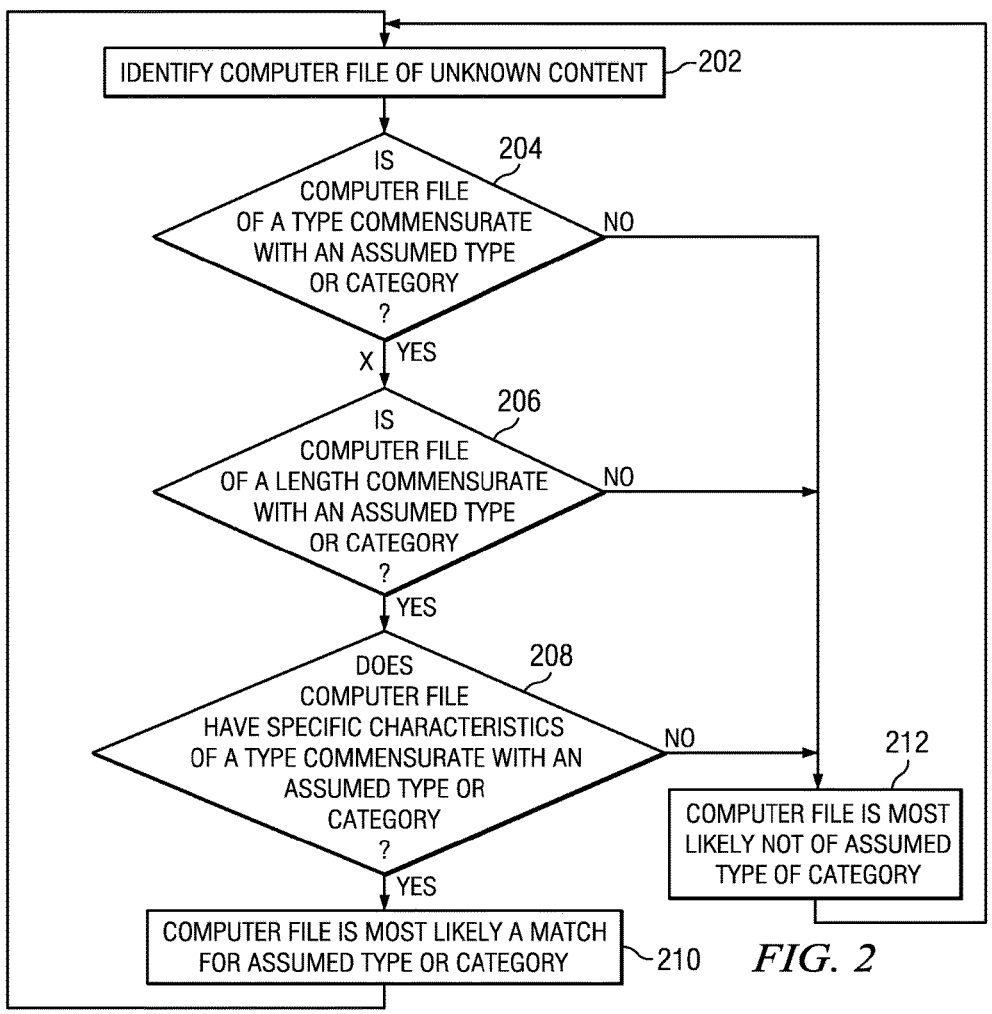
FIG. 2 illustrates a method for determining whether a computer file of unknown content may belong to a given category, in accordance with certain embodiments of the present disclosure.

FIG. 2 illustrates a method 200 for determining whether a computer file of unknown content may belong to a given category, in accordance with certain embodiments of the present disclosure. Method 200 includes analyzing the type, length, and characteristics of the computer file.

According to one embodiment, method 200 preferably begins at step 202. Teachings of the present disclosure may be implemented in a variety of configurations of system 100. As such, the preferred initialization point for method 200 and the order of steps 202-212 comprising method 200 may depend on the implementation chosen.

At step 202, method 200 may identify the computer file of unknown content that requires analysis. As described in more detail above with reference to FIG. 1, the computer file may be a text file, source code, image file, executable file, or any other appropriate computer file. After identifying the computer file, method 200 may proceed to step 204.

At step 204, method 200 may determine whether the computer file is of a type commensurate with an assumed type or category. As an illustrative example, in may be necessary or desirable to determine whether the computer file is malware. In some embodiments, the assumed category or type of known content (i.e., malware) may have an associated computer file type. For example, method 200 may determine whether the computer file of unknown content is an executable file or source code as part of determining whether the computer file is malware. If method 200 determines that the computer file of unknown content is of the appropriate type, method 200 may continue to step 206. If method 200 determines that the computer file of unknown content is not of the appropriate type, method 200 may continue to step 212 where method 200 may notify the user that the computer file of unknown content is most likely not of the assumed type or category. After analyzing the type of the computer file, method 200 may proceed to step 206.

At step 206, method 200 may determine whether the computer file is of a length commensurate with an assumed type or category. In some embodiments, there may be a known range typical of malware executable files or source code. For example, such a range may be files less than one megabyte (1 MB). In other examples, the range may be larger or smaller. Additionally, there may be a number of values, ranges, and/or other thresholds associated with the assumed category, other categories, and/or subsets of those categories. For example, the broad category of "malware" may be broken into further subcategories of viruses, computer worms, trojan horses, spyware, etc., each with their own values, ranges, and/or other associated thresholds. If the computer file of unknown content is not of a length commensurate with an assumed type or category, method 200 may proceed to step 212 where method 200 may notify the user that the computer file may be dismissed as most likely not a match for the assumed type or category. If the computer file of unknown content is of a length commensurate with an assumed type or category, method 200 may proceed to step 208.

At step 208, method 200 may determine whether the computer file possess specific characteristics commensurate with an assumed type or category. In some embodiments, this may include a statistical analysis of comparative entropy, as described above with reference to FIG. 1 and in more detail below with reference to FIGS. 2-8. In the same or alternative embodiments, this may include the source of the computer file (e.g., whether the file is from a trusted source), the author of the computer file, or other specific characteristics commensurate with an assumed type or category. If the computer file of unknown content does not have specific characteristics commensurate with an assumed type or category, method 200 may proceed to step 212 where method 200 may notify the user that the computer file may be dismissed as most likely not a match for the assumed type or category. If the computer file of unknown content does have specific characteristics commensurate with an assumed type or category, method 200 may proceed to step 210 where method 200 may notify the user that the computer file of unknown content is most likely a match for the assumed type or category.

Although FIG. 2 discloses a particular number of steps to be taken with respect to method 200, method 200 may be executed with more or fewer steps than those depicted in FIG. 2. In addition, although FIG. 2 discloses a certain order of steps comprising method 200, the steps comprising method 200 may be completed in any suitable order. For example, in the embodiment of method 200 shown, the analysis of the computer file length at step 206 occurs after the analysis of the computer file type at step 204. However, in some configurations it may be desirable to perform these steps simultaneously or in any appropriate order.

Figure 3:
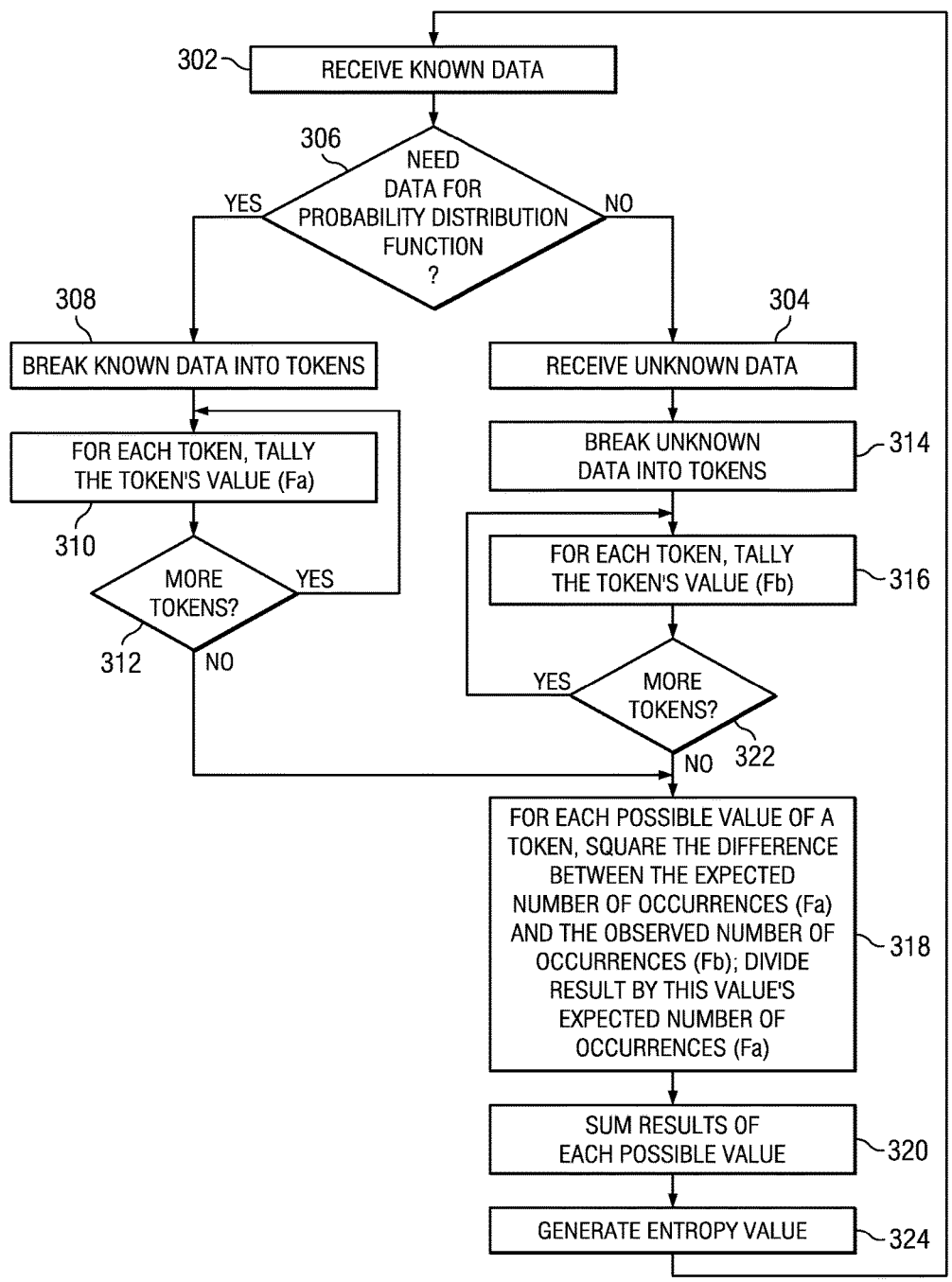
FIG. 3 illustrates a method for performing a statistical analysis of comparative entropy for a computer file of unknown content, in accordance with certain embodiments of the present disclosure.

FIG. 3 illustrates a method 300 for performing a statistical analysis of comparative entropy for a computer file of unknown content, in accordance with certain embodiments of the present disclosure. Method 300 includes breaking the computer file data into token and performing an entropy analysis based at least on the probability distribution of the token values and a known probability distribution.

According to one embodiment, method 300 preferably begins at step 302. Teachings of the present disclosure may be implemented in a variety of configurations of system 100. As such, the preferred initialization point for method 300 and the order of steps 302-324 comprising method 300 may depend on the implementation chosen.

At step 302, method 300 may receive data representative of a computer file of known content ("known data"). As described in more detail above with reference to FIGS. 1-2, the known data may be representative of a computer file of known content such as source code, text file(s), executable files, malware, or other computer files of known content. In some embodiments, the known data may be used to establish a reference probability distribution for use in a statistical analysis of comparative entropy for a computer file of unknown content. The known data may be used to determine whether the computer file of unknown content is likely derived from the computer file of known content and/or whether the computer file of unknown content likely belongs to a particular category of computer files.

As an illustrative example, certain types of compute files may be classified as "malware." This may include viruses, computer worms, spyware, etc. As instances of malware are detected by anti-malware programs, the malware author may often undertake modifications sufficient to avoid detection, but not to fundamentally affect the structure and/or behavior of the malware. The following ANSI-C code, PROGRAM 1, is provided as an illustrative example of an original piece of malware code.

---

PROGRAM 1

```
#include<stdio.h>
main ( ) {
    char* badMessage = "This is a big bad malware. Phear
```

-continued

```
PROGRAM 1
```
```
        me!";
    printf("\n%s\n", badMessage);
}
```

In this illustrative example, PROGRAM 1 may be the known data. That is, in the illustrative example anti-malware programs have learned to detect PROGRAM 1. It may thus serve as a basis for comparison for later iterations of PROGRAM 1. After receiving the known data, method 300 may proceed to step 306.

At step 306, method 300 may determine whether additional data is needed for a reference probability distribution. In some embodiments, entropy analysis engine 106 of system 100 may make this determination regarding whether it may be necessary or desirable to have additional data for the reference probability distribution. For example, in configurations in which the entropy analysis is used to determine whether the computer file of unknown content belongs to a particular category of computer files, it may be necessary or desirable to have a reference probability distribution based on a large number of computer files of known content that belong to the particular category of computer files. In such configurations, method 300 may determine that an insufficient number of computer files of known content has been analyzed to establish the reference probability distribution. For example, in some configurations it may be necessary or desirable to have analyzed thousands of computer files belonging to the malware category. This may be needed in order to capture all of the different varieties of malware, including viruses, computer worms, etc. In other configurations it may be sufficient to have analyzed tens or hundreds of computer files belonging to the source code category. This may be because source code is comprised of text, with certain phrases repeating at high frequency. In still other configurations, the entropy analysis may be used to determine whether the computer file of unknown content was likely derived from the computer file of unknown content. It may be necessary or desirable in such configurations to determine how much of the computer file of known content needs to be analyzed in order to establish the reference probability distribution. For example, a source code file may consist of hundreds of thousands of lines of code. However, it may be sufficient to analyze only a subset of the source code file in order to establish the reference probability distribution. Considerations may be given to the specific characteristics of the source code file (e.g., purpose, modularity, etc.) as well as requirements for analysis overheads (e.g., time, processing resources, etc.) among other considerations.

If additional data is needed for the reference probability distribution, method 300 may proceed to step 308. If no additional data is needed, method 300 may proceed to step 304.

At step 308, entropy analysis engine 106 of system 100 may break the known data into tokens. In some embodiments, a token may be considered to be a unit of length that may specify a discrete value within the computer file. A token may be different depending on the nature of the data being analyzed. Generally, the token for a digital computer file may be data of an 8-bit (byte) data size. However, in some configurations, the token may be larger or smaller or not describable in bits and bytes. For example, if the computer file of unknown content contained a series of numbers of predefined length (e.g., area codes consisting of three digits), then the token may be chosen to be of size three.

In still other configurations, the nature and size of the token may be different to accommodate the desired analysis, including analyzing variable-length tokens. For example, in certain configurations wherein a computer file of unknown content is analyzed to determine whether it belongs to the malware category, it may be necessary or desirable to examine variable-length tokens representative of certain types of function calls used within the computer file of unknown content.

Once the token size has been determined, method 300 may break the known data into tokens before proceeding to step 310. At step 310, entropy analysis engine 106 of system 100 may tally each token's value to establish the reference probability distribution, denoted in the illustration and in the subsequent illustrative example equations as "$F_a$." After creating this tally, method 300 may proceed to step 312, where method 300 may determine whether more tokens remain to be analyzed. If additional tokens remain, method 300 may return to step 310 where the additional tokens may be added to the reference probability distribution. If no additional tokens remain, method 300 may proceed to step 318, where the reference probability distribution may be used to perform an entropy analysis on the unknown data.

Referring again to step 306, method 300 may determine whether additional data is needed for the reference probability distribution. If no additional data is needed, method 300 may proceed to step 304.

At step 304, entropy analysis engine 106 of system 100 may receive data representative of a computer file of unknown content ("unknown data") from database 110 of system 100. The unknown data may then be subjected to an entropy analysis to determine whether the computer file of unknown content is likely derived from the computer file of known content and/or whether the computer file of unknown content likely belongs to a particular category of computer files. In the illustrative example of PROGRAM 1, once anti-malware programs have learned to detect PROGRAM 1, the malware author may modify it by, for example, modifying the output string as shown below in PROGRAM 2.

```
PROGRAM 2
```
```
#include<stdio.h>
main ( ) {
    char* badMessage = "This is a big bad malware version TWO!!!! Phearer me more!";
    printf("\n%s\n", badMessage);
}
```

As a further example, PROGRAM 3, shown below, changes the way in which the output string is processes.

```
PROGRAM 3
```
```
#include<stdio.h>
main ( ) {
    printf("\nThis is a big bad malware version TWO!!!! Phearer me more!\n");
}
```

In this illustrative example, PROGRAMS 2-3 may be separate sets of unknown data. That is, in the illustrative example anti-malware programs have learned to detect PROGRAM 1. The malware author has responded by modifying portions of PROGRAM 1 to create PROGRAMS 2-3, which the anti-malware programs have not yet learned to detect. After receiving the unknown data, method 300 may proceed to step 314.

At step 314, entropy analysis engine 106 of system 100 may break the unknown data into tokens. As described in more detail above with reference to steps 508-10, the token may be of any appropriate size sufficient for the analysis of the unknown data. After breaking the unknown data into tokens, method 300 may proceed to step 316. At step 316, method 300 may tally each token's value into an actual probability distribution, denoted in the illustration and subsequent illustrative example equations as "$F_b$." After creating this tally, method 300 may proceed to step 322 where method 300 may determine whether there remains additional tokens to analyze. If more tokens remain, method 300 may return to step 316. If no more tokens remain, method 300 may proceed to step 318.

At step 318, entropy analysis engine 106 of system 100 may perform an entropy analysis on the unknown data using the reference probability distribution. In some embodiments, the entropy analysis may be a normalized chi-squared analysis such as that described in more detail below and with reference to FORMULA 1. In the same or other embodiments, however, the entropy analysis may be any one of a number of entropy analyses such as a monobit frequency test, block frequency test, runs test, binary matrix rank test, discrete fourier transform, non-overlapping template matching test, etc. Certain configurations of system 100 and method 300 may be designed in such a way as to make best use of a given entropy analysis and/or statistical analysis of the comparative entropy values. Additionally, some types of entropy analyses may be more appropriate for certain types of data than others.

In the illustrative example of step 318, entropy analysis engine 106 of system 100 may perform the entropy analysis by performing the following steps for each possible value of a token: (1) squaring the difference between the expected number of occurrences of the possible token value as represented in the reference probability distribution $F_a$ and the observed number of occurrences of the possible token value as represented in the actual probability distribution $F_b$; and (2) dividing the results by this possible values expected number of occurrences as represented in the reference probability distribution $F_a$. After performing these steps for each possible value of a token, method 300 may proceed to step 320.

At step 320, entropy analysis engine 106 of system 100 may sum the results produced in step 318 for all possible values of a token. After summing these results, method 300 may proceed to step 322

At step 324, entropy analysis engine 106 of system 100 may produce an entropy value for the unknown data as a whole. In some embodiments, the entropy value may be further normalized for ease of analysis. As an illustrative example, the normalization process may take into account the total number of tokens and the degrees of freedom of a given token (i.e., the number of variables in a token that can be different). An equation describing this illustrative example is provided below as FORMULA 1, where the result of FORMULA 1 would be the normalized entropy value for a set of unknown data. In FORMULA 1, "$fa_i$" represents the expected distribution of the i-th possible token value, "$Fb_i$" represents the observed distribution of the i-th possible token value, "c" and "n" represent the upper and lower bounds respectively of the range of discrete values of possible token values, "L" represents the number of tokens, and "D" represents the number of degrees of freedom.

$$\left| \frac{\sum_{i=c}^{n} \frac{(fa_i - fb_i)^2}{fb_i}}{L(n-c+1-D)} - 1 \right| \quad \text{FORMULA 1}$$

In the illustrative example described above with reference to steps 302, 304, an entropy analysis may be performed on PROGRAMS 1-3, with the resulting values for PROGRAMS 2-3 compared to the value for PROGRAM 1 to determine whether either PROGRAM 2 or 3 was likely derived from PROGRAM 1. TABLE 1, provided below, illustrates example entropy values for PROGRAMS 1-3. The entropy values of TABLE 1 were calculated using FORMULA 1.

TABLE 1

| PROGRAM | ENTROPY VALUE |
|---|---|
| PROGRAM 1 | 0.211015027932869 |
| PROGRAM 2 | 0.215907381722067 |
| PROGRAM 3 | 0.221937008588558 |

As described in more detail below with reference to FIGS. 4-5, these entropy values may then be compared to determine whether either PROGRAM 2 or 3 are likely derived from PROGRAM 1. As the illustrative data of TABLE 1 shows, the similarity in entropy values indicate a high likelihood of derivation. After generating the entropy value, method 300 may return to step 302, where method 300 may await new or different known and/or unknown data.

Although FIG. 3 discloses a particular number of steps to be taken with respect to method 300, method 300 may be executed with more or fewer steps than those depicted in FIG. 3. In addition, although FIG. 3 discloses a certain order of steps comprising method 300, the steps comprising method 300 may be completed in any suitable order. For example, in the embodiment of method 300 shown, the generation of the entropy value also normalizes that value. In some configurations, such normalization may be unnecessary or undesirable or may be performed at a later time or by a different system. As an additional example, in some embodiments, the entropy analysis of unknown data may be undertaken in such a way as the reference probability distributions are established and available. In such configurations, it may be unnecessary or undesirable to undertake steps 308-312 for example.

Figure 4:
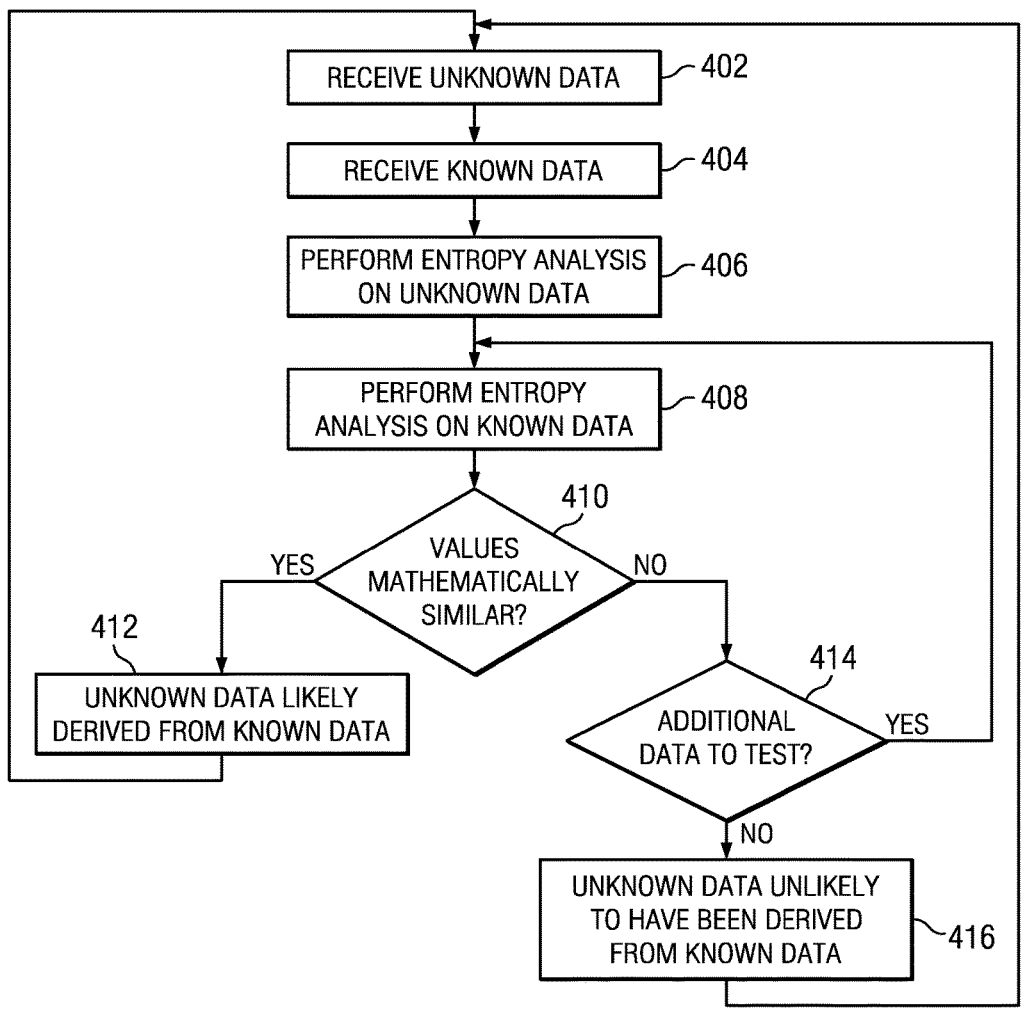
FIG. 4 illustrates a method for performing a statistical analysis of comparative entropy for a computer file of unknown content in order to determine whether it is likely derived from a computer file of known content, in accordance with certain embodiments of the present disclosure.

FIG. 4 illustrates a method 400 for performing a statistical analysis of comparative entropy for a computer file of unknown content in order to determine whether it is likely derived from a computer file of known content, in accordance with certain embodiments of the present disclosure. Method 400 includes performing an entropy analysis on unknown data, performing an entropy analysis on known data, and comparing the results.

According to one embodiment, method 400 preferably begins at step 402. Teachings of the present disclosure may be implemented in a variety of configurations of system 100. As such, the preferred initialization point for method 400 and the order of steps 402-416 comprising method 400 may depend on the implementation chosen.

At step 402, system 100 may receive unknown data, as described in more detail above with reference to FIGS. 1-3.

After receiving unknown data, method 400 may proceed to step 404 where system 100 may receive known data, as described in more detail above with reference to FIGS. 1-3. After receiving known data, method 400 may proceed to step 406.

At step 406, entropy analysis engine 106 of system 100 may perform an entropy analysis on the unknown data. In some embodiments, performing the entropy analysis may include performing an entropy analysis based at least on the observed probability distribution of the token values of the unknown data and a known probability distribution as described in more detail above with reference to FIG. 3. In some embodiments, this entropy analysis may correspond generally to steps 314-324 of FIG. 3. As described in FIG. 3, the output of the entropy analysis may be an entropy value corresponding to the unknown data. After performing the entropy analysis on the unknown data, method 400 may proceed to step 408.

At step 408, entropy analysis engine 106 of system 100 may perform an entropy analysis on the known data. In some embodiments, performing the entropy analysis may include performing an entropy analysis based at least on the observed probability distribution of the token values of the known data and a known probability distribution. As an illustrative example, the known probability distribution may include data representative of a prototypical computer file of known content belonging to the same category as the known data. For example, both the prototypical computer file and the known data may be representative of source code. In such a configuration, the reference probability distribution may be a probability distribution representative of a prototypical source file. The computer file of known content and its associated known data may be representative of a particular instance of source code of interest to a user of system 100. For example, a user of system 100 may want to know whether a particular section of source code has been copied. In this situation, data representative of the original section of source code may correspond to known data and data representative of the possible copy of the source code may correspond to unknown data.

Entropy analysis engine 106 of system 100 may perform the entropy analysis on the known data in order to obtain a base entropy value for the known data. This entropy analysis may be similar to the entropy analysis performed on the unknown data as described in more detail above with reference to FIG. 3. For example, the entropy analysis may include breaking the known data into tokens, tallying the token values for each token, and performing an entropy analysis on the summed results. An illustrative example of the entropy analysis is described in more detail above with reference to FORMULA 1. Once this base entropy value is produced, method 400 may proceed to step 410.

At step 410, method 400 may compare the entropy value for the unknown data and the base entropy value for the known data to determine if they are mathematically similar. In some embodiments, step 410 may be performed by entropy analysis engine 106 or classification engine 112 of system 100. If the values are mathematically similar, method 400 may proceed to step 412 where method 400 may identify the unknown data as likely derived from the known data. After identifying the computer file of unknown content as likely derived from the known data, method 400 may return to step 402.

In some embodiments, system 100 may compare the entropy value for the unknown data and the base entropy value for the known data to see if the difference between the entropy values is within a certain threshold. In some embodiments, it may be useful to apply the entropy analysis to one or more computer file(s) of known content that are not derived from an original file of known content. The resulting threshold value may then be associated with the known data in order to determine whether the unknown data was likely derived from the known data. As an illustrative example, it may be helpful to again consider the examples of PROGRAMS 1-3 described in more detail above with reference to FIG. 3. In order to determine an appropriate threshold, it may be necessary or desirable to first examine computer files of known content that are known to not be derived from PROGRAM 1. In the illustrative example, four control files are used to determine the appropriate threshold. CONTROL FILE 1 is the compiled result of the simplified ANSI-C source code illustrated below, similar to PROGRAM 1-3. CONTROL FILES 2-3 are unrelated data (i.e., unrelated computer programs). CONTROL FILE 4 is a text string formed by appending the binary compiled code of CONTROL FILE 2 to the end of the binary compiled code of CONTROL FILE 3.

| CONTROL FILE 1 |
| --- |
| #include<stdio.h><br>#include<Limits.h><br>main ( ) {<br>    printf("\n");<br>    unsigned int i = 0;<br>    for (i = 0; i <= USHRT_MAX; i++) {<br>        printf("\r%03d", i);<br>    }<br>    printf("\nDONE\n");<br>} |

TABLE 2, provided below, illustrates the example entropy values for PROGRAMS 1-3 and CONTROL FILES 1-4. These example entropy values were calculated using FORMULA 1 as described in more detail above with reference to FIG. 3.

TABLE 2

| PROGRAM | ENTROPY VALUE |
| --- | --- |
| PROGRAM 1 | 0.211015027932869 |
| PROGRAM 2 | 0.215907381722067 |
| PROGRAM 3 | 0.210986477203336 |
| CONTROL FILE 1 | 0.221937008588558 |
| CONTROL FILE 2 | 0.947789453703611 |
| CONTROL FILE 3 | 0.823310253513919 |
| CONTROL FILE 4 | 0.846049756722827 |

By examining the example data of TABLE 2, it may be concluded that a threshold of ±2.32% would indicate that PROGRAMS 2 and 3 are likely to have been derived from PROGRAM 1. The closer the match, the more likely the unknown data has been derived from the known data and vice versa. Accordingly, it may be concluded that an entropy value deviating more than 4% from the entropy of the known data of PROGRAM 1 is unlikely to have been derived from PROGRAM 1.

The data provided in TABLES 1-2, the code of PROGRAMS 1-3, and the information in CONTROL FILES 1-4 are provided solely as an illustrative example to aid in understanding and should not be interpreted to limit the scope of the present disclosure.

If the entropy values of the known and unknown data are not mathematically similar or within a certain threshold, method 400 may proceed to step 414 where method 400 may determine whether additional known data remains to be compared to the unknown data. In some embodiments, a user of system 100 may wish to determine whether the unknown data is derived from any one of a set of known data. As an illustrative example, database 108 of system 100 may contain data representative of all of the source code of interest to a user of system 100. In this example, database 108 may include a large amount of known data. Each set of known data may correspond to an entire computer file or some subsection thereof. For example, in the case of source code, these subsections may include functions, resources, user-specific data, or any other appropriate subsection of data. These subsections may likewise be grouped into larger subsections. Generally, these subsections of computer files may be referred to as "assets."

At step 414, method 400 may determine whether additional assets remain to be tested against the unknown data. In some embodiments, system 100 may therefore be able to determine whether the computer file of unknown content is likely derived from any one of the assets represented by known data stored in database 108 of system 100. If additional assets remain to be tested, method 400 may return to step 408. If no assets remain to be tested, method 400 may proceed to step 416 where method 400 may identify the computer file of unknown content as unlikely to have been derived from any of the assets associated with known data stored in database 108 of system 100. After this identification, method 400 may return to step 402.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, in the embodiment of method 400 shown, the entropy analysis is performed on unknown data prior to being performed on known data. In some embodiments, the entropy analysis may be performed in any appropriate order. In the same or alternative embodiments, the entropy analysis on known data may be performed prior to the beginning of method 400. In such embodiments, database 108 of system 100 may store the base entropy values associated with each asset rather than the known data associated with each asset. Step 404 of method 400 may then be the receipt of the base entropy value for comparison rather than known data.

Figure 5:
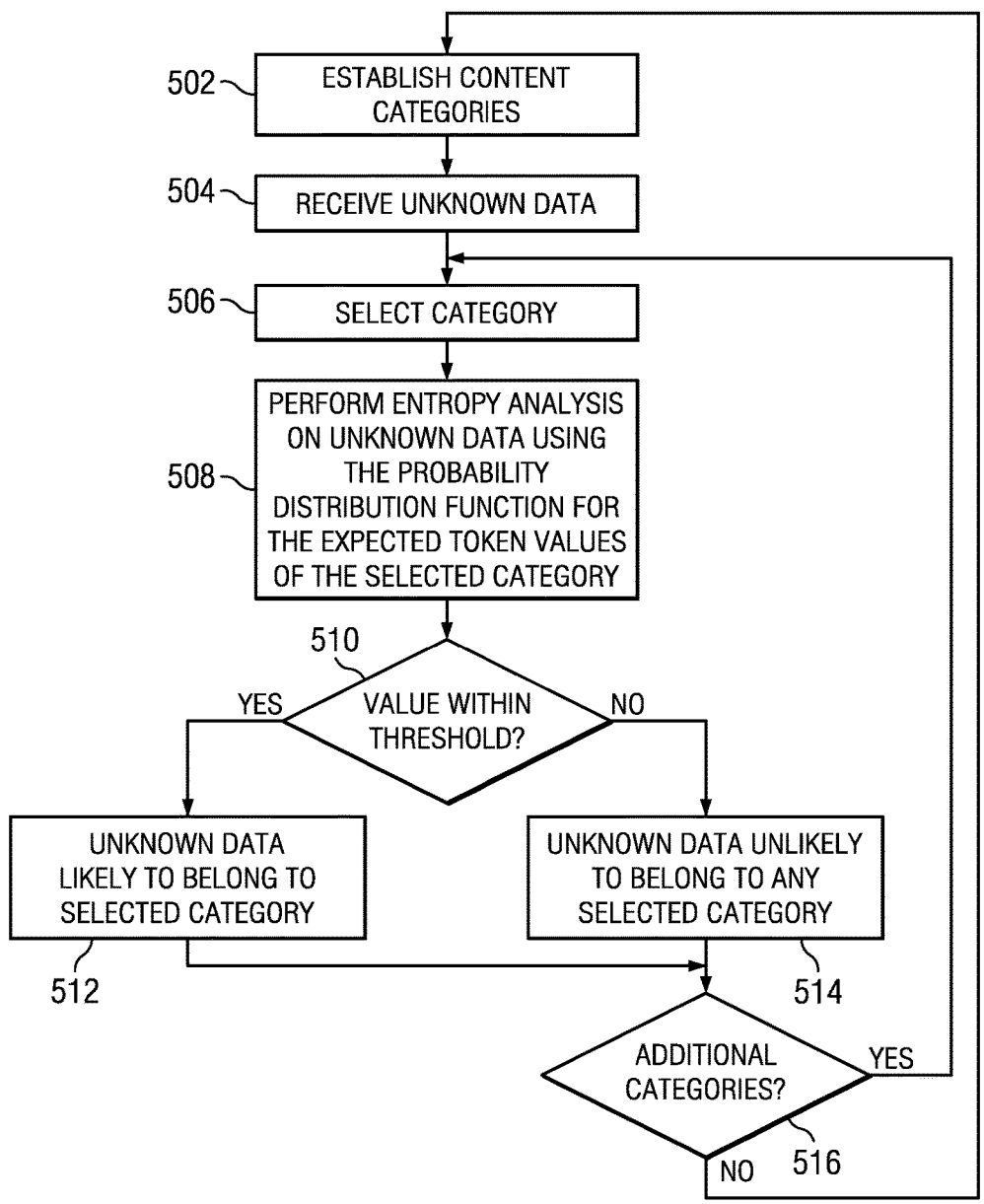
FIG. 5 illustrates a method for classifying a computer file of unknown content into one or more categories of computer files, in accordance with certain embodiments of the present disclosure.

FIG. 5 illustrates a method 500 for classifying a computer file of unknown content into one or more categories of computer files, in accordance with certain embodiments of the present disclosure. Method 500 includes performing an entropy analysis on unknown data using a probability distribution representative of the selected category.

According to one embodiment, method 500 preferably begins at step 502. Teachings of the present disclosure may be implemented in a variety of configurations of system 100. As such, the preferred initialization point for method 500 and the order of steps 502-516 comprising method 500 may depend on the implementation chosen.

At step 502, method 500 may establish content categories. As described in more detail above with reference to FIGS. 1-2, these categories may include broad categories such as source code, text files, executable files, image files, malware, etc., as well as narrower subcategories within these categories. For example, subcategories within the category malware may include viruses, computer worms, spyware, etc. In some embodiments, the categories may be established prior to the initiation of method 500. In other embodiments, method 500 may select a set of all available categories for analysis. For example, method 500 may establish that the user of system 100 wishes to classify the computer file of unknown content into one or more categories of malware. Method 500 may then establish only these subcategories for analysis. After establishing the relevant content categories, method 500 may proceed to step 504.

At step 504, method 500 may receive unknown data. In some embodiments, entropy analysis engine 106 may retrieve the unknown data from database 110 of system 100 as described in more detail above with reference to FIGS. 1-4. After receiving the unknown data, method 500 may proceed to step 506.

At step 506, method 500 may select a first category for analysis from the relevant content categories identified at step 502. As an illustrative example, method 500 may select the category of "viruses" from the list of malware subcategories selected at step 502. After selecting the first category for analysis, method 500 may proceed to step 508.

At step 508, entropy analysis engine 106 of system 100 may perform an entropy analysis on the unknown data using a reference probability distribution associated with the selected category. The formation of the reference probability distribution is similar to the reference probability distribution discussed in more detail above with reference to FIGS. 2-4. In some embodiments, the reference probability distribution may be formed to be representative of a prototypical member of the selected category. As an illustrative example, system 100 may be programmed to know that tokens of a prototypical virus file would be expected to conform, within a certain threshold, to the reference probability distribution. An illustrative example of the entropy analysis is described in more detail above with reference to FORMULA 1. After performing the entropy analysis, method 500 may proceed to step 510.

At step 510, classification engine 112 of system 100 may determine whether the entropy value associated with the unknown data is within the accepted threshold for the selected category. The threshold value may vary from category to category depending on the data available to establish the reference probability distribution, the amount of unknown data available, and other considerations. If the entropy value is within the threshold, method 500 may proceed to step 512 where method 500 may identify the computer file of unknown content as likely to belong to the selected category. After this identification, method 500 may proceed to step 516 where method 500 may determine whether additional categories remain to be analyzed. If additional categories remain, method 500 may return to step 506. If no additional categories remain, method 500 may return to step 502.

Referring again to step 510, if the entropy value is not within the threshold, method 500 may proceed to step 514 where method 500 may identify the computer file of unknown contents as unlikely to belong to the selected category. After this identification, method 500 may proceed to step 516 where method 500 may determine whether additional categories remain to be analyzed. If additional categories remain, method 500 may return to step 506. If no additional categories remain, method 500 may return to step 502.

Although FIG. 5 discloses a particular number of steps to be taken with respect to method 500, method 500 may be executed with more or fewer steps than those depicted in FIG. 5. In addition, although FIG. 5 discloses a certain order of steps comprising method 500, the steps comprising method 500 may be completed in any suitable order. For example, in the embodiment of method 500 shown, the entropy analysis is illustrated as an iterative process based on selected category. In some embodiments, multiple entropy analyses may be performed simultaneously.

Figure 6:
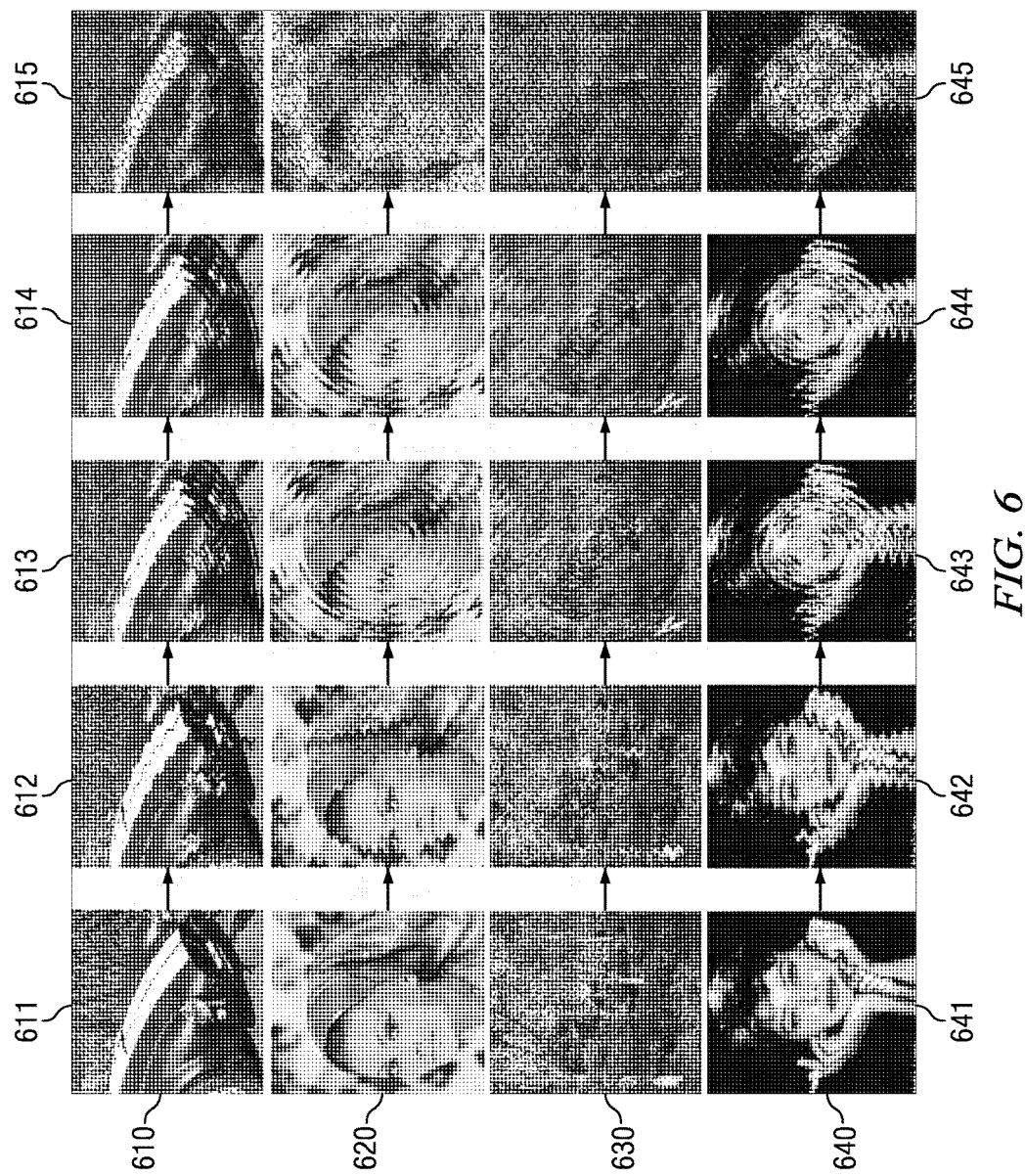
FIG. 6 is an illustrative example of an entropy analysis applied to image files modified with successive types of filters, in accordance with certain embodiments of the present disclosure.

FIG. 6 is an illustrative example of an entropy analysis applied to image files modified with successive types of filters, in accordance with certain embodiments of the present disclosure. The image files and image filters illustrated in FIG. 6 are provided as an illustrative example only and should not be interpreted to limit the scope of the present disclosure.

FIG. 6 includes four rows of image files 610, 620, 660, 640 put through four consecutive image filters: a ripple filter, a wave filter, a blur filter, and a mosaic filter. Each row of image files 610, 620, 630, 640 includes an original image, the original image passed through a ripple filter, the second image passed through a wave filter, the third image passed through a blur filter, and the fourth image passed through a mosaic filter. For example, row 610 includes a series of images of a car: the original car picture 611; ripple car picture 612; ripple and wave car picture 616; ripple, wave, and blur car picture 614; and ripple, wave, blur, and mosaic car picture 615. Likewise, row 620 includes a series of images 622, 623, 624, 625 where the image filters were successively applied to image 621; row 630 includes a series of images 632, 633, 634, 635 where the image filters were successively applied to images 631; and row 640 includes a series of images 642, 643, 644, 645 where the image filters were successively applied to image 341.

In some embodiments, a user of system 100 may wish to determine whether one of the successive pictures was likely derived from one of the earlier pictures. For example, the user may wish to know if image 634 was likely derived from image 630.

In some embodiments, system 100 may attempt to answer this question by performing a statistical analysis of comparative entropy for the original file and the modified file, as described in more detail above with reference to FIGS. 2-5. For example, entropy analysis engine 106 of system 100 may perform an entropy analysis of image 634 and image 631. Classification engine 112 of system 100 may then compare the entropy results and, if the results are within a certain threshold, identify image 634 as likely derived from image 631.

Figure 7:
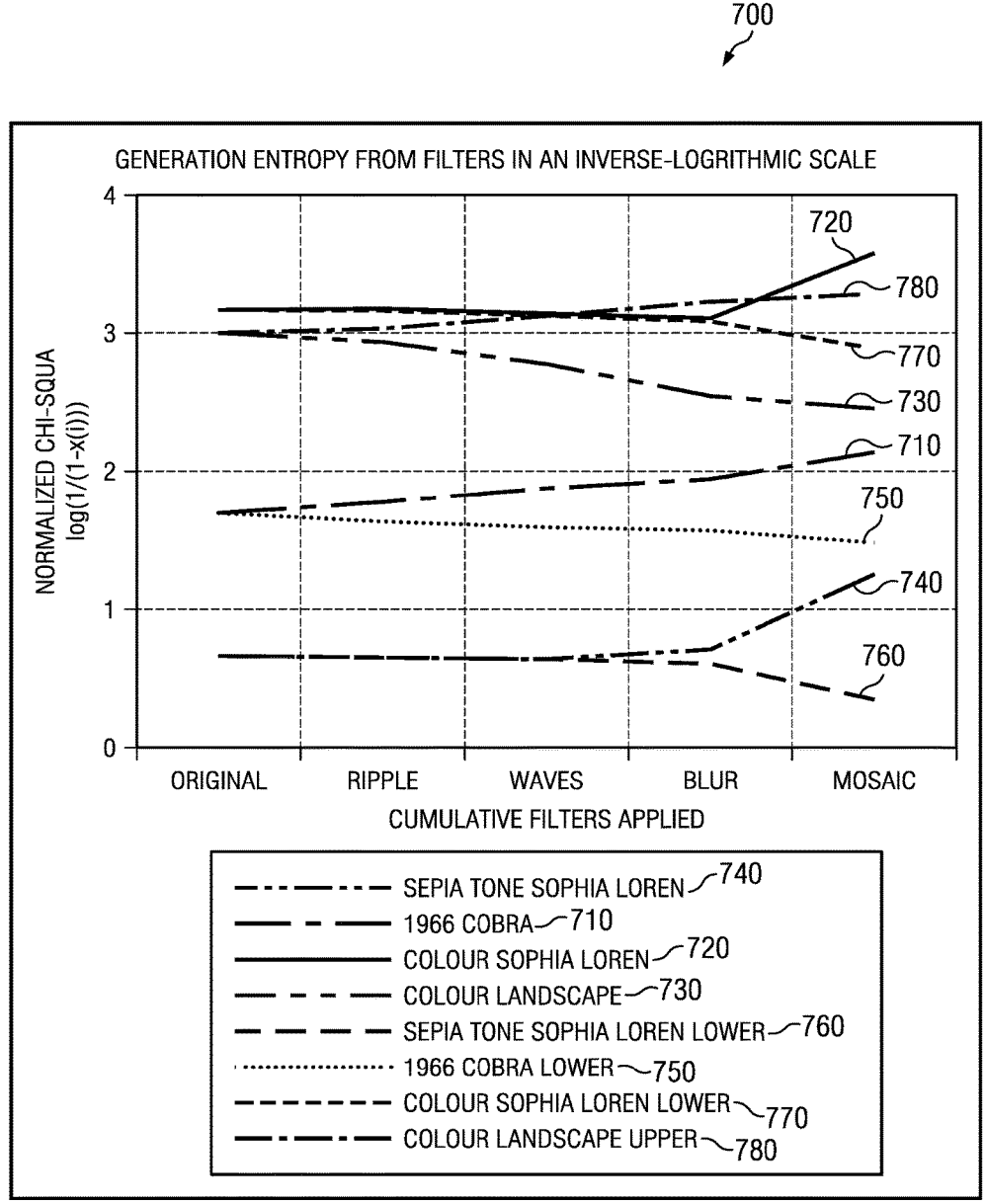
FIG. 7 illustrates an example entropy analysis of the images depicted in FIG. 6, in accordance with certain embodiments of the present disclosure.

FIG. 7 illustrates an example entropy analysis 700 of the images depicted in FIG. 6, in accordance with certain embodiments of the present disclosure. In this illustrative example, a normalized chi-square analysis was performed on each of the images in rows 610, 620, 630, 640. This resulted in the data depicted in data series 710, 720, 730, 740 respectively. The data series 710, 720, 730, 740 depicted in FIG. 7 illustrate that the entropy analysis may be useful in determining whether an image file is likely derived from another image file. Specifically, FIG. 7 illustrates that each set of image files within a row 610, 620, 630, 640 have relatively similar entropy values. FIG. 7 also includes data series 750, 760, 770, 780, which represent a "LOWER" or "UPPER" data value for each of the images illustrated in rows 610, 620, 630, 640 of FIG. 6 respectively. The "LOWER" and "UPPER" data values represent the lower and upper bounds of variance respectively observed in each generation to account for a possible shift of entropy in either direction. Additionally, the illustrative data of FIG. 7 illustrates how entropy values may be useful in classifying a computer file of unknown content into one or more categories. Even given the first-order category estimation provided in the illustrative data of FIG. 7, there is some space between the entropy values for each family of image files. By analyzing the entropy values for a computer file of strictly unknown content, the entropy value alone may be useful in determining which image file family the computer file belongs.

Figure 8:
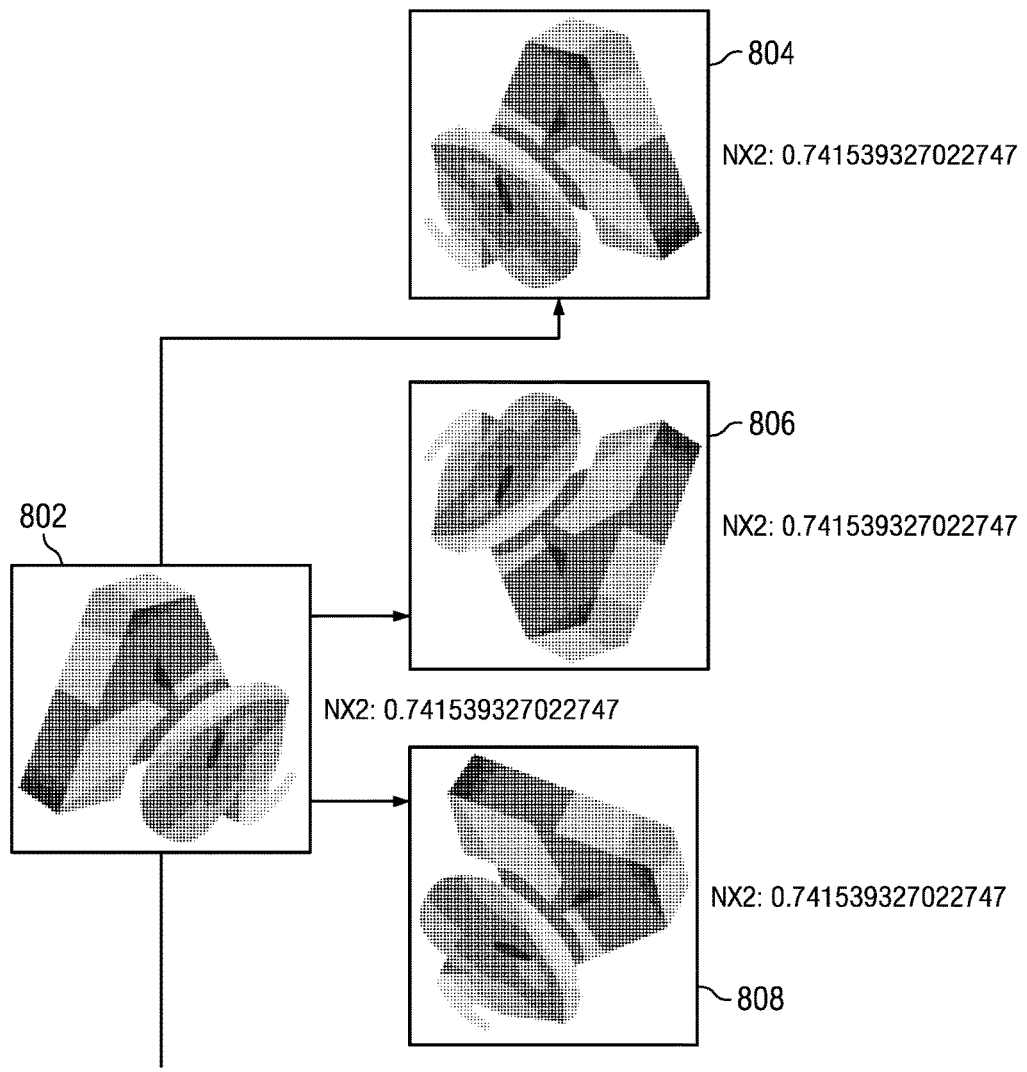
FIG. 8 is an illustrative example of an entropy analysis applied to a modified image file, in accordance with certain embodiments of the present disclosure.

The usefulness of the entropy analysis may be further illustrated by the illustrative example of FIG. 8. FIG. 8 is an illustrative example of an entropy analysis applied to a modified image file, in accordance with certain embodiments of the present disclosure. The image files filters illustrated in FIG. 8 are provided as an illustrative example only and should not be interpreted to limit the scope of the present disclosure.

FIG. 8 includes four image files 804, 806, 808 derived from an original image file 802. In the illustrative example, image file 804 has taken the original image 802 and flipped the image along a vertical axis; image file 806 has rotated original image 802 one hundred eighty degrees (180°); and image file 808 has rotated original image 802 ninety degrees (90°). In order to determine whether image files 804, 806, 808 were derived from original image 102, entropy analysis engine 106 of system 100 may perform an entropy analysis on the image files. Classification engine 112 of system 100 may then compare the resulting entropy values to determine whether the images are related. TABLE 3, provided below, lists example entropy values for each of the image files 802, 804, 806, 808. These entropy values were derived using the entropy analysis described in more detail above with reference to FIGS. 2-4 and FORMULA 1. The data in TABLE 3 illustrates that the entropy values for image files 804, 806, 808 are identical to the entropy value for original entropy value 802. Given this information, system 100 may identify image files 804, 806, 808 as likely derived from original image file 802.

TABLE 3

| IMAGE FILE | ENTROPY VALUE |
| --- | --- |
| 802 | 0.741539327022747 |
| 804 | 0.741539327022747 |
| 806 | 0.741539327022747 |
| 808 | 0.741539327022747 |

Although FIGS. 6-8 illustrates an entropy analysis applied to image files, the entropy analysis may be applied to any appropriate type of computer file. As an additional illustrative example, malware is often difficult to detect because minor variations in the malware computer file may be made to avoid current detection procedures such as signatures. To some computer systems, these minor variations may be sufficient to disable the system's ability to detect the malware. Using the entropy analysis, system 100 may be able to determine whether the modified malware computer file is likely derived from currently known malware computer files. If the new computer file is likely derived from a known computer file, then system 100 may be able to correspondingly improve the detection rates for new types of malware. Additionally, the type of data manipulation illustrated in FIG. 7 may be similar to other types of data manipulation that includes merely reordering the source data (i.e., rearranging the source data without altering any discrete values). This may include scenarios such as data encoding (e.g., Big- vs. Little-Endian) and data encryption (e.g., caesarian cipher encryption).

What is claimed is:

1. At least one non-transitory machine readable storage medium, comprising computer-executable instructions carried on the computer readable storage medium, the instructions, when read and executed by a processor, cause the processor to:
- electronically receive one or more files of an unknown content;
- determine that the one or more files of an unknown content contain malware by:
  - comparing token values between a first probability distribution function associated with a first data set comprising one of more computer files of a first known content and a second probability distribution function associated with a second data set comprising the one or more computer files of an unknown content, wherein the first known content is known to be malware;
  - generating a first entropy result based on a difference between an expected number of occurrences of the token values in the first probability distribution function and an actual number of occurrences of the token values in the second probability distribution function; and
  - determining that the second data set is substantially related to the first data set based on a determination that the first entropy result is within a threshold; and
- based on the determination that the one or more files of an unknown content contain malware, notify a user that the unknown content is malware.

2. The at least one non-transitory machine readable storage medium of claim 1, further comprising instructions to cause the processor to:
- compare the token values between a third probability distribution function of a third data set comprising a second known content and the second probability distribution function;
- generate a second entropy result from the third data set and the second data set; and
- determine whether the second data set is substantially related to the third data set based on whether the second entropy result is within the threshold.

3. The at least one non-transitory machine readable storage medium of claim 1, wherein the instructions that cause the processor to generate the first entropy result further cause the processor to determine whether a first entropy value associated with the first data set is mathematically similar to a second entropy value associated with the second data set.

4. The at least one non-transitory machine readable storage medium of claim 1, wherein the determination whether the second data is substantially related to the first data set is further based on whether the second data set is likely derived from the first data set.

5. The at least one non-transitory machine readable storage medium of claim 1, wherein the first data set comprises data representative of a probability distribution function associated with one or more resources, the one or more resources constituting a portion of the first known content.

6. The at least one non-transitory machine readable storage medium of claim 1, wherein the second data set comprises data representative of a probability distribution function associated with one or more resources, the one or more resources constituting a portion of the unknown content.

7. The at least one non-transitory machine readable storage medium of claim 1, wherein the first known content and the unknown content are members of one or more of a plurality of categories of computer files.

8. The at least one non-transitory machine readable storage medium of claim 7, wherein the instructions further cause the processor to categorize the unknown content into the one or more of the plurality of categories of computer files based substantially on the determination that the second data set is substantially related to the first data set.

9. The at least one non-transitory machine readable storage medium of claim 7, wherein the plurality of categories of computer files include at least one of: malware, source code, image files, or object code.

10. The at least one non-transitory machine readable storage medium of claim 2, wherein the instructions that cause the processor to generate the second entropy result further cause the processor to determine whether a third entropy value associated with the third data set is mathematically similar to a second entropy value associated with the second data set.

11. The at least one he non-transitory machine readable storage medium of claim 2, wherein the determination whether the second data is substantially related to the third data set is further based on whether the second data set is likely derived from the third data set.

12. The at least one non-transitory machine readable storage medium of claim 2, wherein the third data set comprises data representative of a probability distribution function associated with one or more resources, the one or more resources constituting a portion of the second known content.

13. The at least one non-transitory machine readable storage medium of claim 2, wherein the second known content is a member of one or more of a plurality of categories of computer files.

14. The at least one non-transitory machine readable storage medium of claim 13, wherein the instructions further cause the processor to categorize the second known content into the one or more of the plurality of categories of computer files based substantially on the determination that the second data set is substantially related to the third data set.

15. The at least one non-transitory machine readable storage medium of claim 13, wherein the plurality of categories of computer files include at least one of: malware, source code, image files, or object code.

16. An electronic system for determining the similarity between a first data set and a second data set, the system comprising:
- a computing device configured to:
- electronically receive one or more files of an unknown content;
- determine that the one or more files of an unknown content contain malware by:
  - comparing token values between a first probability distribution function associated with the first data set comprising one or more computer files of a first known content and a second probability distribution function associated with the second data set comprising one or more computer files of an unknown content, wherein the first known content is known to be malware;
  - generating a first entropy result based on a difference between an expected number of occurrences of the token values in the first probability distribution function and an actual number of occurrences of the token values in the second probability distribution function; and
  - determining that the second data set is substantially related to the first data set based on a determination that the first entropy result is within a threshold; and based on the determination that the one or more files of an unknown content contain malware, notify a user that the unknown content is malware.

17. The electronic system of claim 16, wherein the computing device is also configured to:
compare the token values between a third probability distribution function of a third data set comprising a second known content and the second probability distribution function;
generate a second entropy result from the third data set and the second data set; and
determine whether the second data set is substantially related to the third data set based on whether the second entropy result is within the threshold.

18. The electronic system of claim 16, wherein the computing device is also configured to generate the first entropy result further based on a determination whether a first entropy value associated with the first data set is mathematically similar to a second entropy value associated with the second data set.

19. The electronic system of claim 16, wherein the computing device is also configured to determine whether the second data is substantially related to the first data set further based on whether the second data set is likely derived from the first data set.

20. The electronic system of claim 16, wherein the first data set comprises data representative of a probability distribution function associated with one or more resources, the one or more resources constituting a portion of the first known content.

21. The electronic system of claim 16, wherein the second data set comprises data representative of a probability distribution function associated with one or more resources, the one or more resources constituting a portion of the unknown content.

22. The electronic system of claim 16, wherein the first known content and the unknown content are members of one or more of a plurality of categories of computer files.

23. The electronic system of claim 22, wherein the computing device is further configured to categorize the unknown content into the one or more of the plurality of categories of computer files based substantially on the determination that the second data set is substantially related to the first data set.

24. The electronic system of claim 22, wherein the plurality of categories of computer files include at least one of: malware, source code, image files, or object code.

25. The electronic system of claim 17, wherein the computing device is also configured to generate the second entropy result further based on a determination whether a third entropy value associated with the third data set is mathematically similar to a second entropy value associated with the second data set.

26. The electronic system of claim 17, wherein the computing device is also configured to determine whether the second data is substantially related to the third data set further based on whether the second data set is likely derived from the third data set.

27. The electronic system of claim 17, wherein the third data set comprises data representative of a probability distribution function associated with one or more resources, the one or more resources constituting a portion of the second known content.

28. The electronic system of claim 17, wherein the second known content is a member of one or more of a plurality of categories of computer files.

29. The electronic system of claim 28, wherein the computing device is further configured to categorize the second known content into the one or more of the plurality of categories of computer files based substantially on the determination that the second data set is substantially related to the third data set.

30. The electronic system of claim 28, wherein the plurality of categories of computer files include at least one of: malware, source code, image files, or object code.

* * * * *

UNITED STATES PATENT AND TRADEMARK OFFICE
CERTIFICATE OF CORRECTION

PATENT NO.         : 10,423,786 B2
APPLICATION NO.    : 15/352158
DATED              : September 24, 2019
INVENTOR(S)        : David Neill Beveridge et al.

It is certified that error appears in the above-identified patent and that said Letters Patent is hereby corrected as shown below:

In the Claims

Column 18, Claim 11, Line 16, "The at least one he non-transitory machine readable" should be:
--The at least one non-transitory machine readable--

Signed and Sealed this
Fifth Day of March, 2024

Katherine Kelly Vidal
*Director of the United States Patent and Trademark Office*